Jan. 7, 1964 D. A. PAYNTER ETAL 3,117,241

TRANSMIT-RECEIVER SWITCH UTILIZING RESONANT CIRCUITS AND OPPOSITELY POLED PARALLEL DIODES FOR ISOLATION

Filed Sept. 29, 1961

INVENTORS:
DONALD A. PAYNTER,
GUNTER JANSEN,
BY *[signature]*
THEIR ATTORNEY.

United States Patent Office 3,117,241
Patented Jan. 7, 1964

3,117,241

TRANSMIT-RECEIVER SWITCH UTILIZING RESONANT CIRCUITS AND OPPOSITELY POLED PARALLEL DIODES FOR ISOLATION

Donald A. Paynter, Syracuse, and Gunter Jansen, East Syracuse, N.Y., assignors to General Electric Company, a corporation of New York Filed Sept. 29, 1961, Ser. No. 141,859
9 Claims. (Cl. 307—88.5)

The present invention relates to an improved transmit-receive switching circuit of the electronic type, and more particularly to a compact, light weight transmit-receive switching circuit primarily adaptable for relatively low frequency application, such as for use in sonar systems and low frequency two way communication systems.

In sonar systems, as well as in many two way communication systems, it is normally desirable to connect the transmitter and receiver to the same transducer element. This necessitates the employment of a transmit-receive switch which prevents local coupling between the transmitter and receiver so that high power transmitted signals do not damage the receiver, and low power received signals are not attenuated by the transmitter circuit. In addition to performing the above function effectively, it is desirable that the transmit-receive switch be of simplified construction, and in sonar systems be capable of high speed operation so that close-in targets may be readily detected.

In the past, diode pairs composed of two parallel diodes of opposite polarity have been used in various circuit configurations to perform a transmit-receive function. The conduction properties of the diodes are utilized to distinguish between and maintain separate the transmitted and received signals. The present invention employs a plurality of diode pairs connected in a novel circuit configuration which has the advantage of providing a high attenuation of the transmitted signals at the receiver terminals, with only slight dissipation of the transmitted energy. The circuit, which is of relatively simplified construction, also provides a low impedance path for the received signals.

Accordingly, it is an object of the invention to provide a novel transmit-receive switching circuit of simplified construction which effectively attenuates the transmitted signal applied to the receiver terminals.

It is another object of the invention to provide a transmit-receive switching circuit of improved form which is capable of high speed operation in addition to effectively attenuating the transmitted signal applied to the receiver terminals.

A more specific object of the invention is to provide a transmit-receive switching circuit employing a plurality of diode pairs connected in a novel circuit configuration which effectively attenuates the transmitted signal applied to the receiver terminals and provides a low impedance path free of transmitted interference for the received signals.

In accordance with one aspect of the invention there is provided a transmit-receive switching circuit for coupling a transmitter and a receiver to the same transducer element which employs a plurality of diode pairs, each pair composed of parallel oppositely poled diodes, in combination with inductive and capacitive reactance elements for providing variable impedance paths between the transmitter and the transducer, and between the transducer and the receiver, which prevent local coupling between the transmitter and receiver. The diodes of said pairs are fully conducting in response to high intensity transmitted signals and essentially nonconducting in response to low intensity received signals. The transducer is coupled to the receiver by a reactance network including a capacitance connected by one diode pair in parallel with a first inductance, and connected in series with a second inductance. Said capacitance with said first inductance form a high impedance parallel resonant circuit between the transducer and the receiver in response to transmitted signals, and with said second inductance form a low impedance series resonant circuit between the transducer and receiver in response to received signals. Another diode pair is connected across the receiver input terminals for further attenuating the transmitted signal. A third diode pair is serially coupled between the transmitter and the transducer for providing a low impedance path therebetween for the transmitted signal and a high impedance path for the received signal. Thus, the transmitted signal is readily conducted to the transducer and is highly attenuated at the receiver, and the received signal is readily conducted from the transducer to the receiver and substantially unaffected by the transmitter.

In accordance with a further aspect of the invention a series, shunt transistor combination is coupled to the receiver input terminals, coupled between the receiver and the reactants network, which acts to further attenuate the transmitted signal applied to the receiver.

Although the features of the invention which are believed to be novel are set forth with particularity in the appended claims, the invention itself both as to its organization and method of operation, together with further objects and advantages thereof, may best be understood by reference to the following description taken in connection with the accompanying drawings in which:

Figure 1:
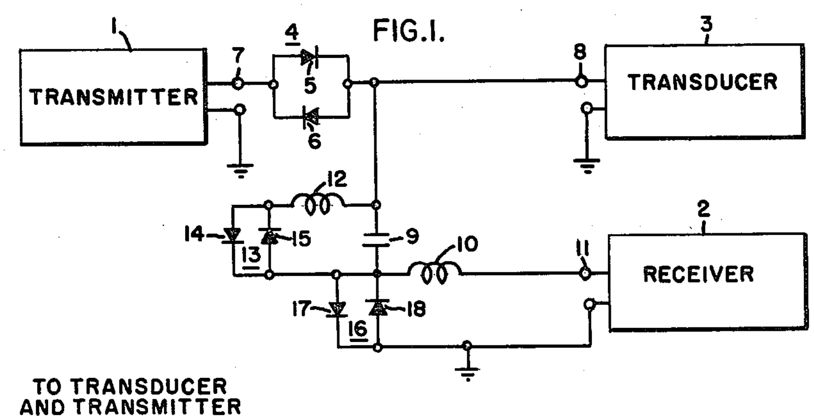
FIGURE 1 is a schematic diagram of one embodiment of the invention.
Figure 2:
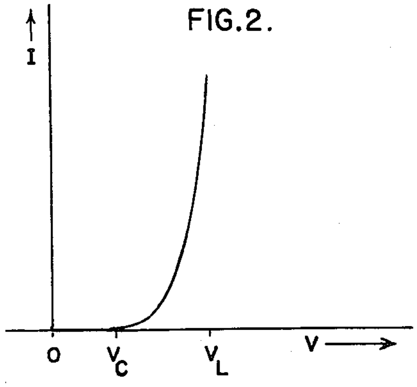
FIGURE 2 is a curve showing the V-I characteristics of typical diode elements employed in the circuits of FIGURES 1 and 3.

Referring now to FIGURE 1, a transmitter 1 and a receiver 2 are coupled to a transducer 3 by a transmit-receive switching circuit of novel configuration, in accordance with the invention. Transmitter 1 may be a sonar type transmitter operating typically at a frequency of 20 kc., the transmitted signals being reflected and received by receiver 2. The transducer 3 may be an electromechanical transducer which converts the electrical signal of the transmitter to a mechanical vibration, and which converts the reflected mechanical vibrations to an electrical signal. When considering a two way communication system transducer 3 would be the antenna. A first diode pair 4, composed of a pair of parallel oppositely poled unidirectional current devices or semiconductor diodes 5 and 6, is connected between the ungrounded terminal 7 of the transmitter and the ungrounded terminal 8 of the transducer. Diodes 5 and 6, as well as the other diodes in the circuit, preferably have discrete low and high conductivity regions, such as illustrated by the V-I characteristic in FIGURE 2. The slope of the curve is essentially zero and the current cut-off at low voltages, $0-V_c$, the slope rising and becoming extremely steep at a limiting voltage $V_L$. Silicon diodes are well adapted for such operation, with exemplary values of $V_c$ and $V_L$ being ¼–½ and ¾ volts, respectively. Accordingly, the diodes in the circuit are fully conducting in response to high power transmitted signals, typically in the range of hundreds of volts, and essentially nonconducting in response to low power received signals, in the order of millivolts. Diode pair 4 provides a low impedance path between the transmitter 1 and transducer 3 for the transmitted signal, and provides a high impedance path for the received signal and for any transmitter noise when the transmitter is turned off. Terminal 8 is connected through the series connection of a capacitor 9 and an inductor 10 to the ungrounded input terminal 11 of the receiver 2. In parallel with capacitor 9 is connected the series connection of an inductor 12 and a second diode pair 13 composed of parallel opposite poled diodes 14 and 15. A third diode pair 16 composed of parallel oppositely poled diodes 17 and 18 is connected between the junction of capacitor 9 and inductor 10 and ground. Capacitor 9 and inductor 10 provide a series resonant circuit during the receive portion of the operation when diode pair 13 is in a high impedance state, and capacitor 9 and inductor 12 provide a parallel resonant circuit during the transmit portion of the operation when diode pair 13 is in a low impedance state.

During the transmit period the high power transmitted signal biases each of the diodes into their fully conducting condition. Hence, diode pair 4 provides a low impedance path between the transmitter 1 and the transducer 3, and diode pair 13 completes the parallel resonant circuit of capacitor 9 and inductor 12 to provide a high shunt impedance for the transmitted signal. Any small portion of the transmitted signal passed by the parallel resonant circuit having a voltage which exceeds the limiting level of diode pair 16 is amplitude limited by said diode pair so that a very highly attenuated signal is coupled through inductor 10 to the input terminal 11 of the receiver 2. During the receive period, the received signals from terminal 8 are of insufficient amplitude to cause the diodes to be conducting, they then being in their high impedance state, so that the received signal is highly attenuated by diode pair 4 and is essentially uncoupled to the transmitter 1. Since diode pair 13 is in a high impedance state, capacitor 9 and inductor 10 act as a series resonant circuit and provide a low impedance path for the received signal which is coupled to terminal 11 of receiver 2. The diode pair 16 is also in a high impedance state and dissipates little of the received signal energy.

The circuit illustrated in FIGURE 1 may be appreciated to be desirable for use with a receiver of low input impedance. For relatively high input impedance receivers, the circuit with respect to inductor 10 may be altered so as to obtain advantages of simplicity, or to provide a stepped up received signal voltage at the receiver input terminals. Thus, for circuit simplification the inductor 10 can be replaced by a direct connection between capacitor 9 and terminal 11, capacitor 9 providing relatively little attenuation of the received signals. For stepping up the voltage, the inductor 10 can be connected between capacitor 9 and ground, with receiver terminal 11 connected to the junction of the two reactance elements. This connection also facilitates the use of a tunable transformer coupling at the receiver input.

Figure 3:
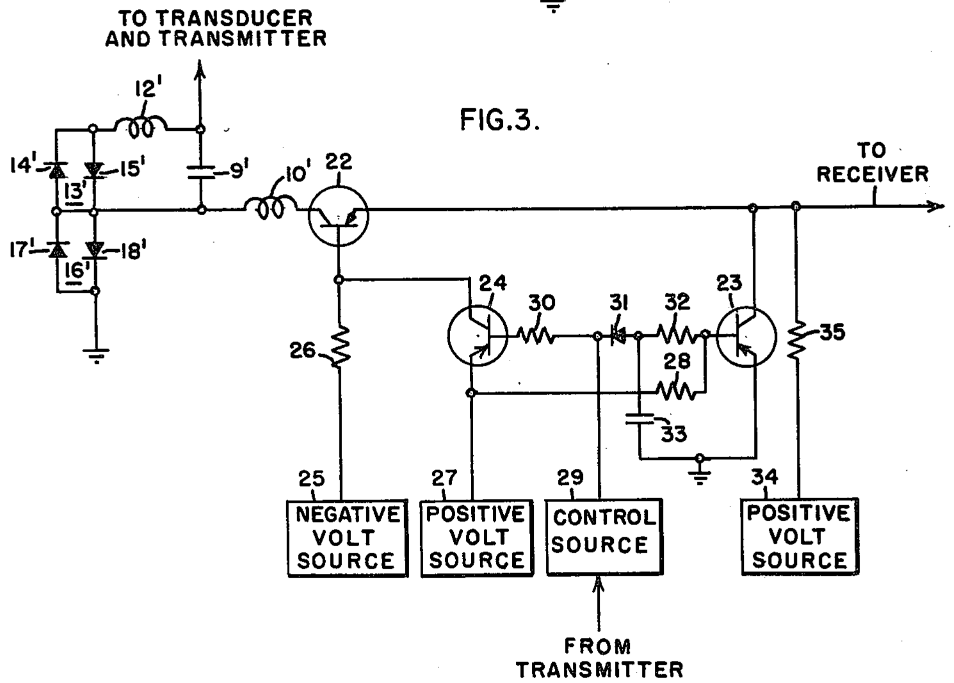
FIGURE 3 is a schematic diagram of a second embodiment of the invention.

Turning now to FIGURE 3, there is illustrated a modified circuit of that of FIGURE 1 wherein a series connected transistor 22, a shunt connected transistor 23 and the control circuitry for these transistors including transistor 24, are coupled between the inductor 10' and the receiver input terminals. That portion of the circuit of FIGURE 3 which is similar to FIGURE 1 is provided with the same reference characters, but with an added prime notation. Transistors 22 and 23 further attenuate that portion of the transmitted signal that may appear across diode pair 16', while providing a low impedance path for the received signal. Since voltage limiting diodes 17' and 18' do not attenuate unwanted high energy signals to a value less than their limiting level, normally somewhat less than one volt, without transistors 22 and 23 the receiver AGC circuit places the receiver in a low gain condition during the "transmit" operation. When changing over to "receive," a finite time is required for the receiver to readjust to the normally low level received signals. By introducing transistors 22 and 23, the receiver never has a high voltage applied to its input terminals and is always in the proper gain condition, so that immediately upon termination of the transmitted signal the receiver is ready to receive.

The receiver input terminal is connected through PNP transistor 22 to inductor 10', the emitter electrode of transistor 22 being connected to said terminal and the collector electrode being connected to the inductor 10'. Between the receiver terminal and ground is connected PNP transistor 23, with the collector electrode thereof connected to said terminal and the emitter electrode connected to ground. A source of negative potential 25 is connected by a current limiting resistor 26 to the base electrode of transistor 22. A source of positive potential 27 is connected through transistor 24 to the base electrode of transistor 22, the emitter electrode of transistor 24 being connected to potential source 27 and the collector electrode of transistor 24 being connected to the base electrode of transistor 22. Potential source 27 is also connected through a resistor 28 to the base electrode of transistor 23. A control source 29 providing positive and negative switching voltages is connected through a resistor 30 to the base electrode of transistor 24 and through a diode 31, poled in the backward direction, and a resistor 32 to the base electrode of transistor 23. Control source 29 may be responsive to a signal from the transmitter 1 so as to provide the negative voltage during transmitter operation and the positive voltage when the transmitter is off. A storage capacitor 33 is connected from the junction of diode 31 and resistor 32 to ground. A source of positive potential 34 is connected by a current limiting resistor 35 to the collector electrode of transistor 23. The control circuit acts to cause transistor 22 to be nonconducting and transistor 23 fully conducting during the transmit period, and to cause transistor 22 to be fully conducting and transistor 23 nonconducting during the receive period.

Considering then the operation of the circuit of FIGURE 3, those elements in common with the circuit of FIGURE 1 operate essentially in the manner previously described. During the transmit portion of the operation any residual voltage appearing across diode pair 16' is further attenuated by the nonconducting transistor 22 in combination with fully conducting transistor 23. Transistors 22 and 23 are triggered by a negative control voltage from source 29. When applied to the base electrode of transistor 24 the negative control voltage triggers the transistor into conduction which couples the positive potential of bias source 27 to the base electrode of transistor 22 so as to cut off transistor 22. In addition, the negative control voltage is applied to the base electrode of transistor 23 for causing this transistor to be fully conducting. During this period a negative voltage is developed across capacitor 33. When the transmitter is cut off a positive switching voltage is provided by the control source 29 which terminates conduction of transistor 24, causing transistor 22 to conduct. The negative voltage across capacitor 33 maintains conduction of transistor 23 for a short period, in the order of 80$\mu$ sec., until the capacitor 33 is allowed to discharge. When the capacitor is sufficiently discharged the fixed bias potential from source 27 biases the transistor 23 into a nonconducting state. The delay in cutting off transistor 23 is necessary in order to attenuate the voltage transient generated by the switching of transistor 22. Thus, transistor 22 provides a low impedance path for the received signals and transistor 23 which is in shunt with receiver input terminals provides a high shunt impedance so as to dissipate very little of the received signal energy. When the transmitter again conducts, the control source 29 in response to said conduction provides a negative control voltage to again cause nonconduction of transistor 22 and conduction of transistor 23.

In one practical embodiment of the invention as illustrated in FIGURE 3 when employed in a sonar system at 20 kc., the following circuit parameters are used, which are given here for purposes of illustration and are not to be construed as limiting:

| | |
|---|---|
| Diode 5 | 1N645. |
| Diode 6 | 1N645. |
| Diode 14 | 1N1124. |
| Diode 15 | 1N1124. |
| Diode 17 | 1N645. |
| Diode 18 | 1N645. |
| Diode 31 | 1N645. |
| Inductor 10 | 8 mh. |
| Inductor 12 | 8 mh. |
| Capacitor 9 | .0075 μf. |
| Transistor 22 | Type 2N427. |
| Transistor 23 | Type 2N1038. |
| Transistor 24 | Type 2N427. |
| Resistor 26 | 47K ohms. |
| Resistor 28 | 1K ohm. |
| Resistor 30 | 240 ohms. |
| Resistor 32 | 620 ohms. |
| Resistor 35 | 47K ohms. |
| Voltage source 25 | −22 volts. |
| Voltage source 27 | +1.5 volts. |
| Voltage source 34 | +22 volts. |
| Control voltage | ±3 volts. |
| Transmitter 1 | 20 kilocycles, 500 volts. |
| Receiver input impedance | 1K ohm. |

Although the invention has been described with relation to sonar systems it should be appreciated that the transmit-receive circuits disclosed have application to a low frequency communication system of the transceiver type wherein the transmitter and receiver equipment are coupled to the same antenna. In addition, the present invention has application to high frequency operation in which instance the inductance and capacitance components are required to be adjusted in accordance with the frequency of operation.

Further, it should be recognized that numerous modifications may be made to the invention as specifically disclosed in FIGURES 1 and 3 without exceeding the basic principles taught. For example, diode pair 13, performing essentially as a switch, can obviously be connected between the high voltage terminals of inductor 12 and capacitor 9. In addition, NPN type transistors can readily be employed, with the corresponding voltage polarity changes. Also, as previously mentioned, inductor 10 can be connected in other configurations than shown.

The appended claims are intended to include all modifications falling within the true scope and spirit of the invention.

What we claim as new and desire to secure by Letters Patent of the United States is:

1. In combination with a transmitter and a receiver having a common connection, means for preventing local coupling of transmitted signals between said common connection and the input of said receiver comprising a reactance network coupled in a path between said common connection and the receiver input, said network including a capacitance and an inductance connected in parallel branches by a pair of parallel oppositely poled unidirectional current devices, said unidirectional current devices being conducting in response to said transmitted signals so that said capacitance and inductance form a parallel resonant circuit tuned to said signals, said unidirectional current devices being nonconducting in response to received signals so that said reactance network provides a high impedance connection for said transmitted signals and a relatively low impedance connection for said received signals.

2. The combination as recited in claim 1 wherein a second pair of parallel oppositely poled unidirectional current devices is connected to said path and across said receiver input, said second pair of devices being conducting in response to transmitted signals attenuated by said parallel resonant circuit to amplitude limit the attenuated transmitted signals.

3. The combination as recited in claim 2 wherein a third pair of parallel oppositely poled unidirectional current devices is connected between the output of said transmitter and said common connection, said third pair of devices being conducting in response to said transmitted signals and nonconducting in response to said received signals so as to provide a low impedance path between the transmitter and common connection for said transmitted signals and a high impedance path for said received signals.

4. In combination with a transmitter and a receiver having a common connection means for preventing local coupling of transmitted signals between said common connection and the input of said receiver comprising a reactance network coupled in a path between said common connection and the receiver input, said network including a capacitance connected in parallel with a first inductance by a pair of parallel oppositely poled unidirectional current devices, said capacitance being coupled in series with a second inductance, said unidirectional current devices being conducting in response to said transmitted signals so that said capacitance and first inductance form a parallel resonant circuit tuned to said signals, and said unidirectional current devices being nonconducting in response to received signals so that said capacitance and said second inductance form a series resonant circuit tuned to said received signals, said reactance network thereby providing a high impedance connection for said transmitted signals and a low impedance connection for said received signals.

5. The combination as recited in claim 4 wherein a second pair of parallel oppositely poled unidirectional current devices is connected to said path and across said receiver input, said second pair of devices being conducting in response to transmitted signals attenuated by said parallel resonant circuit to amplitude limit the attenuated transmitted signals.

6. The combination as recited in claim 5 wherein a third pair of parallel oppositely poled unidirectional current devices is connected between the output of said transmitter and said common connection, said third pair of devices being conducting in response to said transmitted signals and nonconducting in response to said received signals so as to provide a low impedance path between the transmitter and common connection for said transmitted signals and a high impedance path for said received signals.

7. In combination with a transmitter and a receiver connected to a common transducer element, means for preventing local coupling of transmitted signals between said transducer and the input of said receiver and for preventing the coupling of received signals between said transducer and the transmitter output comprising a reactance network coupled in a path between the transducer element and the receiver input, said network including a capacitance connected in parallel with a first inductance by a first pair of parallel oppositely poled diodes, said capacitance being coupled in series with a second inductance, a second pair of parallel oppositely poled diodes connected to said path and across said receiver input, a third pair of parallel oppositely poled diodes connected between the transmitter output and said transducer element, the diodes of said diode pairs being conducting in response to said transmitted signals and nonconducting in response to said received signals, said capacitance and said first inductance forming a parallel resonant circuit tuned to said transmitted signals during conduction of said diodes, said capacitance and said second inductance forming a series resonant circuit tuned to said received signals during nonconduction of said diodes, said diode pairs and said reactance network thereby providing a high impedance path between said transducer output and said receiver input for said transmitted signals and a low impedance path for said received signals.

8. The combination as recited in claim 7 wherein a first and second transistor are connected between said reactance network and said receiver input, said first transistor being connected in series with said receiver input and said second transistor being connected across said receiver input, control means for triggering said first transistor into a nonconducting state and said second transistor into a fully conducting state in the presence of the transmitted signals and for triggering the first transistor into a fully conducting state and the second transistor into a nonconducting state in the presence of the received signals.

9. The combination as recited in claim 1 wherein a second pair of parallel oppositely poled unidirectional current devices is connected between the output of said transmitter and said common connection, said second pair of devices being conducting in response to said transmitted signals and nonconducting in response to said received signals so as to provide a low impedance path between the transmitter and common connection for said transmitted signals and a high impedance path for said received signals.

References Cited in the file of this patent

UNITED STATES PATENTS

| | | |
|---|---|---|
| 2,929,015 | Fleming | Mar. 15, 1960 |
| 2,959,778 | Bradley | Nov. 8, 1960 |